W. G. SANBORN.
CHUCK.
APPLICATION FILED APR. 3, 1908.
933,923.
Patented Sept. 14, 1909.
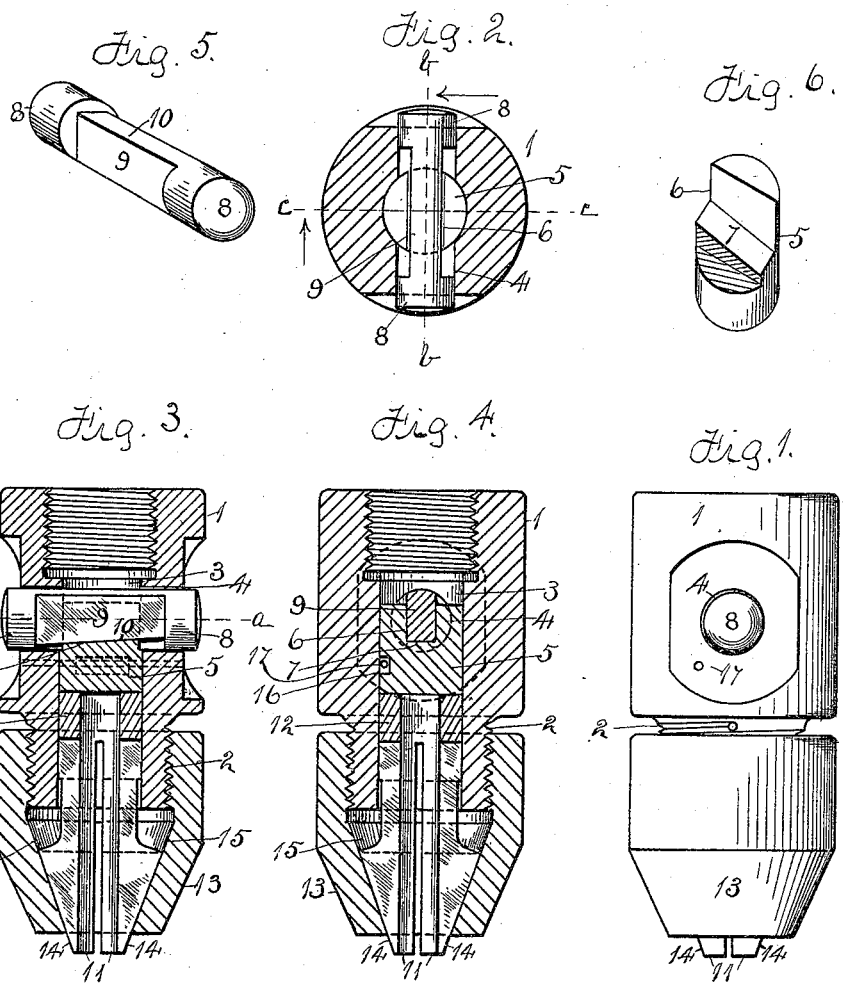
Witnesses
G. Ward.
E. Behel.
Inventor
William G. Sanborn
By his Attorney
A. O. Behel

UNITED STATES PATENT OFFICE.

WILLIAM G. SANBORN, OF ROCKFORD, ILLINOIS.

CHUCK.

933,923.

Specification of Letters Patent. Patented Sept. 14, 1909.

Application filed April 3, 1908. Serial No. 425,040.

*To all whom it may concern:*

Be it known that I, WILLIAM G. SANBORN, a citizen of the United States, residing at Rockford, in the county of Winnebago and State of Illinois, have invented certain new and useful Improvements in Chucks, of which the following is a specification.

The object of this invention is to construct a chuck which is provided with means for adjusting the jaws to different sized tools, and another means for clamping the tool in the jaws.

In the accompanying drawings, Figure 1 is a side elevation of my improved chuck. Fig. 2 is a transverse section on dotted line *a a* Fig. 3. Fig. 3 is a longitudinal section on dotted line *b b* Fig. 2. Fig. 4 is a longitudinal section on dotted line *c c* Fig. 2. Fig. 5 is a perspective view of the wedge. Fig. 6 is a perspective view of the block, partly in section.

The body 1 has one end provided with external screw-threads 2. A shank or other connection may be made with the other end of the body, or a shank may be made integral with the head. The end of the body having the screw-threads 2, is formed with a lengthwise extending bore 3, and a transverse cylindrical opening 4 is formed through the body 1 near the end of the bore 3. Within the bore 3 is located a cylindrical block 5 which is provided with a lengthwise extending transverse slot 6, and bottom 7, of which extends diagonally to the length of the block forming an inclined surface.

A wedge is cylindrical in cross section, and its ends 8, are of a size to move endwise freely in the transverse opening 4 in the body. This wedge has its center portion flattened on two sides, leaving the section 9 of a thickness to closely fit within the slot 6 of the block 5. This wedge is tapering having one face 10 inclined to the direction of the length of the wedge and is located in contact with the inclined surface 7 of the block. Each of the jaws 11 having an inclined surface 14 are formed integral with the end 12. The end 12 of the jaws 11 is located within the bore 3 of the head 1, and is seated against the solid end of the block 5. A ferrule 13 is internally screw-threaded and adapted to turn in connection with the screw-threads 2 of the head 1. The internal surfaces 15 of the free end of this ferrule are fitted to the inclined surfaces of the jaws 11.

After the wedge is placed in the opening 4, the block placed in the bore 3 in the head, and the end 12 of the jaws placed in the bore 3 against the end of the block 5, the ferrule is turned in connection with the screw-threaded end of the head 1. The tool, for instance a drill, is located between the jaws, and the ferrule 13 is turned against the inclined surfaces 14 of the jaws, thereby closing the jaws in contact with the tool. The wedge is then driven in its lengthwise direction which will cause the inclined surface 10 of the wedge to contact with the inclined surface 7 of the block 5, and force the inclined surfaces 14 of the jaws along the internal inclined surfaces 15 of the ferrule, thereby increasing the holding action of the jaws in connection with the tool. In driving the wedge in the reverse direction, the pressure of the jaws upon the tool will be relieved, and the tool may be removed. The block has a lengthwise slot 16 within which is located a pin 17, which is supported by the body 1, thereby permitting a lengthwise movement to the block, but preventing it becoming disengaged from the body when the jaws are removed, and thereby retaining the block and wedge in the body. The ferrule 13 is adjusted in connection with the body to close the jaws loosely around the tool when different sized tools are used, and the holding force of the jaws against the tool is increased by the action of the wedge.

I claim as my invention.

A chuck comprising a body having a lengthwise bore and a transverse cylindrical opening, jaws supported by the body and located in the lengthwise bore and capable of lengthwise movement, a block located in the lengthwise bore of the body and capable of lengthwise movement therein and having one end slotted, the bottom of the slot being inclined and the unslotted end of the block contacting with the jaws, a wedge located and movable in the transverse opening and exerting a lengthwise movement of the block, said wedge having cylindrical ends and three flat surfaces, one of the surfaces being tapering in the lengthwise direction of the wedge and contacting with the inclined bottom of the slot, the other two flat surfaces located in the slot in the end of the block.

In testimony whereof I have hereunto set my hand in presence of two subscribing witnesses.

WILLIAM G. SANBORN.

Witnesses:
A. O. BEHEL,
E. D. E. N. BEHEL.